United States Patent [19]

Földi

[11] Patent Number: 5,247,595
[45] Date of Patent: Sep. 21, 1993

[54] DEVICE FOR OPTICAL CONNECTION OF AN OPTICAL ELEMENT, FOR EXAMPLE AN OPTICAL FIBER, WITH A LENS

[75] Inventor: Peter Földi, Forsheda, Sweden

[73] Assignee: AB Stratos Connectors, Gnosjo, Sweden

[21] Appl. No.: 899,905

[22] Filed: Jun. 17, 1992

[30] Foreign Application Priority Data

Jun. 17, 1991 [SE] Sweden .................. 9101877
Oct. 2, 1991 [SE] Sweden .................. 9102851

[51] Int. Cl.⁵ .................................. G02B 6/32
[52] U.S. Cl. .......................... 385/78; 385/35; 385/60; 385/93
[58] Field of Search ............... 385/78, 35, 92, 93, 385/94, 43, 42, 60

[56] References Cited

U.S. PATENT DOCUMENTS

| | | | |
|---|---|---|---|
| 3,832,028 | 8/1974 | Kapron | 385/43 |
| 4,707,067 | 11/1987 | Haberland et al. | 385/93 X |
| 4,781,431 | 11/1988 | Wesson et al. | 385/78 X |
| 4,812,002 | 3/1989 | Kato et al. | 385/33 |
| 4,989,944 | 2/1991 | Tholen et al. | 385/35 |
| 5,077,819 | 12/1991 | Greil et al. | 385/35 X |
| 5,094,518 | 3/1992 | Musk | 385/35 |

Primary Examiner—John D. Lee
Assistant Examiner—Phan T. Heartney
Attorney, Agent, or Firm—Pollock, Vande Sande & Priddy

[57] ABSTRACT

A device for optically connecting an optical element, for example an end portion of an optical fibre (2), with a spherical lens (4), comprises a retainer (6) and a connector element (14). The retainer (6) fixes the optical element in a predeterment position in relation to an outer reference surface (8) of the retainer. The connector element (14) has at least one surface (18) for determining the position of the spherical lens (4) and at least one surface (16) for determining the position of the retainer (6) in relation to the spherical lens (4) and thereby for defining the relative position between the optical element (2) and the spherical lens (4). The surface (18) for determining the position of the spherical lens (4) is constituted by a conical surface (18) tapering in the direction of the optical element (2).

24 Claims, 5 Drawing Sheets

DEVICE FOR OPTICAL CONNECTION OF AN OPTICAL ELEMENT, FOR EXAMPLE AN OPTICAL FIBER, WITH A LENS

FIELD OF THE INVENTION

The present invention relates to a device for optical connection of an optical element, for example an end portion of an optical fiber, with a spherical lens.

BACKGROUND OF THE INVENTION

In fiber optical systems there are at different points required optical connections between the different optical elements included in the system. Thus, there are required optical connections between different lengths of optical fibers, between an optical fiber and a light source, for example a diode, between an optical fiber and a light detector. Each connection must be established using very great accuracy if the losses shall be kept at a minimum. Of course, the problem of providing a correct connection is caused by the fact that optical fibers have a very small cross sectional area and also because small deviations from a correct position between two fiber end portions to be connected with each other cause substantial losses. It is important especially to avoid angular deviations between the fibers, i.e. it is important that the fibers connected with each other are positioned on the same optical axis.

Different devices for providing a correct connection of optical fibers with each other and with other optical elements have been suggested. Such devices comprise lens systems in which the light beam is magnified so that the light transmission in the connection takes place at a sectional area which is magnified several times providing for a corresponding reduction of the sensitivity to deviations from the correct position. Thereby, it is a drawback that the connection of two fiber end portions to each other requires instead of one single connection, i.e. the connection between the fiber end portions, an optical connection of the fiber end portions, each to one lens, and an optical connection between the lenses, i.e. three connections. It is important that the optical fibers and the lenses are positioned on the same optical axis as well as that the end surfaces of the fibers are positioned in the focus of the lens in question. Thus, the connections between the optical fibers and the lenses are the most sensitive parts of the connection system while the optical connection of the lenses to each other can easily be provided without errors.

Different devices for connecting an optical element with a lens are previously known. A drawback of previously known connection devices is that they are either complicated in their construction or use or offer insufficient accuracy with regard to the fact that the optical element and the lens shall be positioned on the same optical axis and that the optical element shall be positioned in the focus of the lense.

SUMMARY OF THE INVENTION

The object of the present invention is to provide a device for optical connection of an optical element, for example an end portion of an optical fiber, with a spherical lens in which the connection between the optical element and the spherical lens is provided while positively determining the correct relative position without the requirement for adjustment operations at the time of connection in the field.

In order to comply with this object there is, according to the present invention provided a device of the kind described comprising a retainer for fixing the optical element in a position predetermined in relation to an outer reference surface of the retainer and a connector element having at least one surface for determining the position of the spherical lens and having at least one surface for determining the position of the retainer in relation to the spherical lens and thereby for defining the relative position between the optical element and the spherical lens. The device is characterized in that the surface for determining the position of the spherical lens is constituted by a conical surface tapering in the direction of the optical element.

In the device according to the invention there is positively and in a simple way provided a correct relative position between the optical element and the spherical lens without requirement for any adjustment operations at the time of connection in the field.

In a preferred embodiment of the device according to the invention the surface of the connector element for determining the position of the retainer in relation to the spherical lens is constituted by a conical surface which is adapted to engage the reference surface of the retainer, the conical surface being positioned at a distance from and on the same axis as the conical surface for determining the position of the spherical lens and tapering in the direction thereof.

In the case that the optical element is constituted by an optical fiber it is according to the present invention preferred that the retainer is constituted by a sleeve having a flat end surface coinciding with the end surface of the optical fiber.

The device according to the invention can be used in different combinations of optical elements and a spherical lens, for example for transmitting a light beam from a diode to an optical fiber through two spherical lenses, two devices according to the present invention being used, one device for connecting the diode to the spherical lens and one device for connecting the optical fiber with another spherical lens. The correct relative position between the two connector elements for transmitting the light beam between the spherical lenses is in a known manner provided by means of guiding pins or other guiding surfaces on the connector elements. It is realized that the relative position between the spherical lenses does not require any adjustment of a great accuracy of the relative position between the lens and the optical element connected therewith.

The present invention is described in the following with reference to the accompanying drawings, in which:

DETAILED DESCRIPTION OF THE INVENTION

Figure 1:
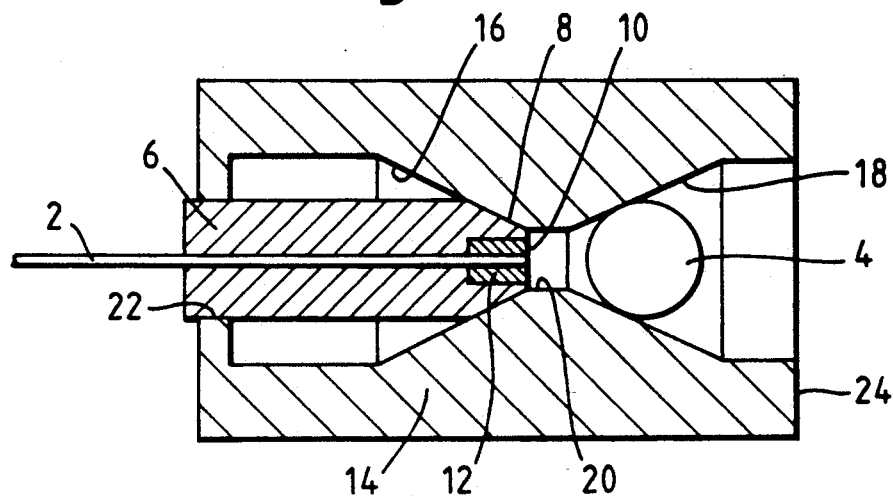
FIGS. 1, 2, 3, 4 and 5 are longitudinal sectional views of different embodiments of devices according to the present invention for optically connecting an optical element with a spherical lens.

The device according to the present invention is adapted to be included in such a system for connecting a first optical element, for example an optical fiber, with another optical element, for example another optical fiber, in which system the optical elements are connected each with one lens so that the transmission of the light between the optical elements takes place through the lenses. The embodiment of a device according to the present invention schematically shown in section in FIG. 1 is used for connecting an optical fiber 2 with a spherical lens 4. The end portion of the optical fiber 2 is enclosed in a fiber retainer 6 designed as a sleeve. The fiber retainer 6 is cylindrical along the main portion of its outer surface and has at its right end in the figure a conical reference surface 8 connecting with a flat end surface 10 is formed by an insert 12 of ceramic material moulded into the fiber retainer.

The optical fiber 2 is fixed in the fiber retainer 6 in a known manner, for example according to the principle shown in the Swedish patent specification No. 7901398-3 and/or by means of an adhesive, the end surface of the optical fiber 2 being positioned in the same plane as the flat end surface 10 of the insert 12. A correct position of the end surface of the optical fiber 2 can be provided by fixing the fiber with the end portion projecting somewhat outside the plan end surface 10, whereupon the fiber is ground to the plane of the end surface 10. The flat end surface 10 of the fiber retainer 6 has an exactly predetermined position in relation to the conical reference surface 8 of the fiber retainer, and when the end surface of the fiber 2 is positioned in the plane of the end surface 10 the end surface of the fiber 2 will consequently be related to the conical reference surface 8 in a predetermined way.

The device for optical connection of the optical fiber 2 with the spherical lens 4 comprises in addition to the fiber retainer 6 a connector element 14. The connector element 14 is provided with surfaces for determining the relative position between the fiber retainer 6 and thereby the optical fibre 2 and the spherical lens 4. The surfaces of the connector element 14 for determining the relative position between the fiber retainer 6 and therewith the optical fiber 2 and the spherical lens 4 are constituted by two conical surfaces 16 and 18 positioned at an axial distance from each other on the same axis and tapering in the direction towards each other. Thereby the conical surface 16 is adapted to engage the conical reference surface 8 of the fiber retainer 6 while the conical surface 18 is adapted to engage the spherical lens 4. Between the conical surfaces 16 and 18 there is a cylindrical surface portion 20, thus connecting with the small ends of the conical surfaces 16 and 18.

The fiber retainer 6 and the spherical lens 4 are maintained in firm engagement with the conical surfaces 16 and 18, respectively, by means of arrangements not shown in FIG. 1. Regarding the fiber retainer 6 these arrangements can be constituted by a conventional sleeve nut engaging a shoulder on the fiber retainer 6 not shown in the drawing while the arrangement for the spherical lens 4 can be constituted by devices of the kind shown in FIGS. 9, 10 and 11.

The conical surfaces 16 and 18 are designed and positioned in relation to each other so that the optical fiber 2 and the spherical lens 4 are positioned on the same optical axis and at such an axial distance from each other that the end surface of the optical fiber 2 is in the focus of the spherical lens 4 when the conical reference surface 8 and the spherical lens 4 engage its conical surfaces.

In order to make sure that the fiber retainer 6 is oriented so that the portion of the optical fiber received in the fiber retainer is over its total length positioned on the optical axis common with the optical axis of the spherical lens, the connector element 14 is provided with support surfaces 22 adapted to engage the fiber retainer 6 at the end of the fiber retainer 6 opposite from the conical reference surface 8.

In a plane outside the spherical lens 4 the connector element 14 has a contact surface 24. The contact surface 24 is adapted to engage a corresponding surface of another connector element with which the connector element 14 shall be connected for providing an optical connection of the optical fiber 2 with another optical element, for example another optical fiber, a diode or a light sensor device, included in the other connector element. It is thereby important that the contact surface 24 is exactly perpendicular to the axis of the conical surfaces 16 and 18, and this is suitably provided by manufacturing the conical surfaces 16 and 18 and the contact surface 24 in one and the same machine and in a continuous operation.

Figure 2:
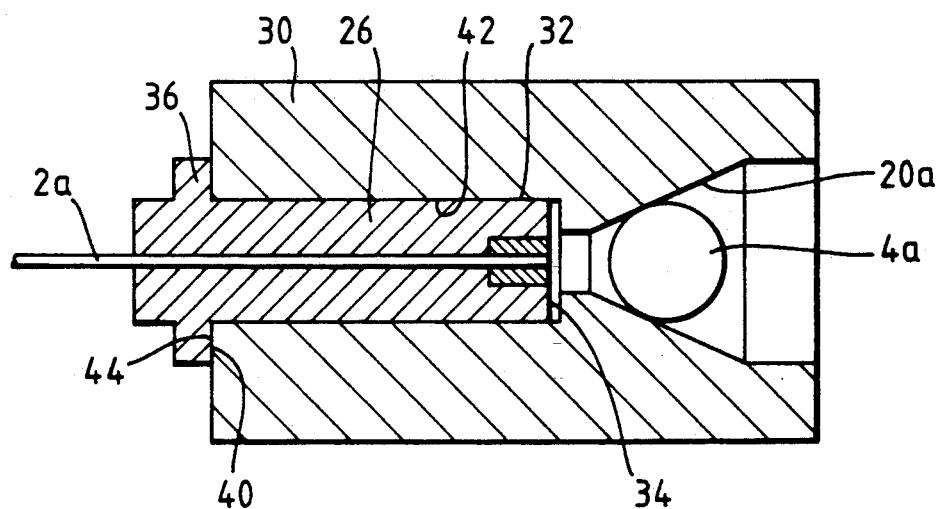

The embodiment of the device according to the present invention shown in FIG. 2 is a modified design of the retainer 26 enclosing the end portion of the optical fiber 2a and the design of the surfaces of the connector element 30 cooperating with the retainer 26. Thus, the fiber retainer sleeve 26 according to FIG. 2 has an cylindrical, outer surface 32 and a flat end surface 34 connected therewith. At its outer surface the retainer 26 has an annular flange 36, having an annular side 40 which forms in relation to the cylindrical reference surface 32 a perpendicular reference surface 40 which takes an exactly predetermined position in relation to the flat end portion 34 of the fiber retainer 26 and thereby in relation to the end surface of the fiber 2a. Thus, the end surface of the fiber 2a takes a predetermined position in relation to the cylindrical reference surface 32 as well as to the annular reference surface 40 extending transversely thereto.

The connector element 30 is provided with surfaces for defining the relative position between the fiber retainer 26 and thereby the optical fiber 2a and the spherical lens 4a. The surfaces of the connector element 30 for defining the relative position between the fiber retainer 26 and thereby the optical fiber 2a on one hand and the spherical lens 4a on the other hand are constituted by a conical surface 20a, a cylindrical surface 42 forming an opening for receiving the retainer 26 and an end surface 44 extending perpendicular to the cylindrical surface 42 and surrounding the opening for receiving the retainer 26 formed by the cylindrical surface 42. The conical surface 20a and the cylindrical surface 42 are positioned on the same axis. The conical surface 20a is adapted to engage a spherical lens 4a while the cylindrical surface 42 is adapted to engage the cylindrical surface 32 of the retainer 26 and the surface 44 of the connector element 30 is adapted to engage the annular surface 40 of the flange 36 fixed to the retainer 26.

The engagement surfaces of the retainer 26 and the connector element 30 are positioned and designed so in relation to each other that the optical fiber 2a and the spherical lens 4a when the spherical lens 4a engages the conical surface 20a and the surfaces 32 and 40 of the retainer 30 engage the surfaces 42 and 44, respectively, of the connector element 30 are positioned on the same optical axis and at such a distance from each other that the end surface of the optical fiber 2a is positioned in the focus of spherical lens 4a.

Figure 3:
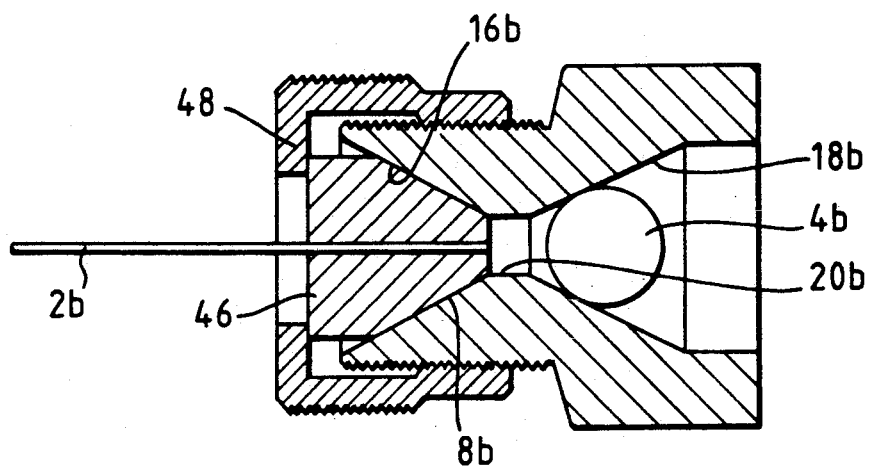

Also the device shown in section in FIG. 3 is provided for optical connection of an optical fiber 2b with a spherical lens 4b. The device according to FIG. 3 comprises like the device according to FIG. 1 a connector element 14b having conical surfaces 16b and 18b which are positioned on the same axis at an axial distance from each other and tapering in direction towards each other. Between the conical surfaces 16b and 18b there is a cylindrical surface portion 20b.

The device according to FIG. 3 differs from the device according to FIG. 1 in respect of the construction of the retainer for the optical fiber. In the embodiment according to FIG. 3 the retainer for the optical fiber is constituted by a clamping sleeve 46 which like the retainer 6 in the embodiment according to FIG. 1 has a conical reference surface 8b. The clamping sleeve 46 has an axially extending opening in which the end portion of the optical fiber 2b is positioned. The clamping sleeve 46 is designed so that the cross sectional area of the opening can be changed by exerting an outer pressure on the clamping sleeve 46. This provides that the optical fiber 2b after having been introduced into the opening in the clamping sleeve 46 can be fixed therein by exerting on the clamping sleeve 46 an outer force. In the embodiment shown in FIG. 3 this is provided by forcing the clamping sleeve 46 into the narrower portion of the conical surface 16b by means of a barrel nut 48. The radial compression of the clamping sleeve 46 which in turn provides that the optical fiber 2b is fixed in the opening in the clamping sleeve can be provided by manufacturing the clamping sleeve from two or more or less firmly jointed sectors. In this embodiment the correct position of the end surface of the optical fiber 2 in relation to the clamping sleeve 46 and thereby in relation to the spherical lens 4b must be determined prior to and/or subsequent to the positioning of the fiber in the clamping sleeve by manual measures.

The embodiment according to FIG. 3 can be considered to represent a device in which the requirements for accuracy are less than in the embodiment according to FIG. 1 but in which the less accuracy is compensated by a simple construction and easier mounting of the fiber in the fiber retainer.

Figure 4:
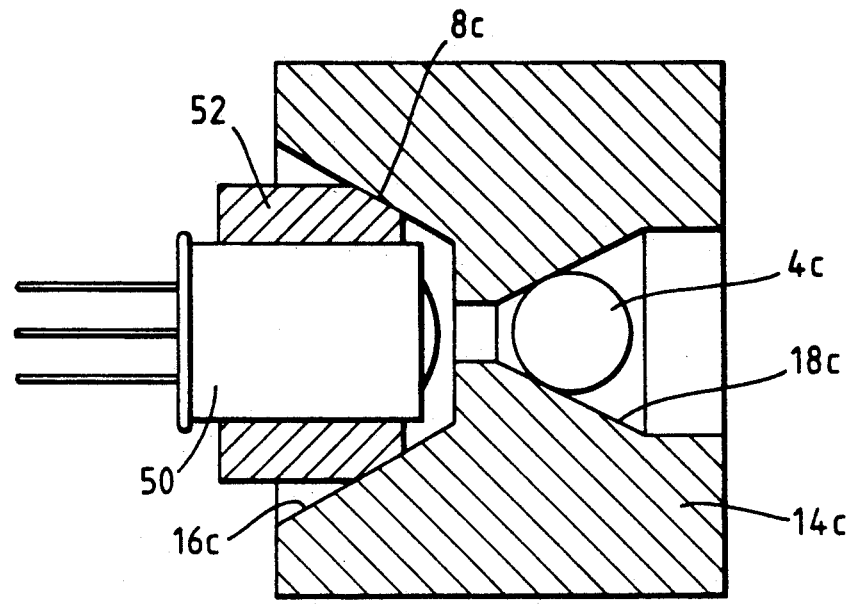

The embodiment of the device according to the invention shown in FIG. 4 is adapted for connecting a diode 50 with a spherical lens 4c. Like the devices according to FIGS. 1 and 3 the device comprises a connector element 14c having two conical surfaces 16c and 18c positioned at an axial distance from each other on the same axis and tapering towards each other. In addition to the connector element 14c the device according to the embodiment of FIG. 4 comprises a retainer for the diode 50 in the form of a clamping sleeve 52. The clamping sleeve 52 has a conical reference surface 8c adapted to engage the conical surface 16c in order to define the position of the diode in relation to the spherical lens 4c which engages the conical surface 18c. Also in this embodiment the conical surfaces 16c and 18c provide a correct relative position between the diode 50 and the spherical lens 4c so that the diode 50 and the lens 4c are positioned on the same optical axis and at a correct axial distance from each other.

In a modified embodiment of the device according to FIG. 4 the diode is provided with a fixed outer sleeve instead of the clamping sleeve 52. This fixed sleeve is not provided with its final shape until the sleeve has been connected with the diode, for example by providing a conical reference surface of the sleeve by means of turning. Thus, the position of the reference surface is determined so that the axial distance of the diode from the spherical lens is correct.

Figure 5:
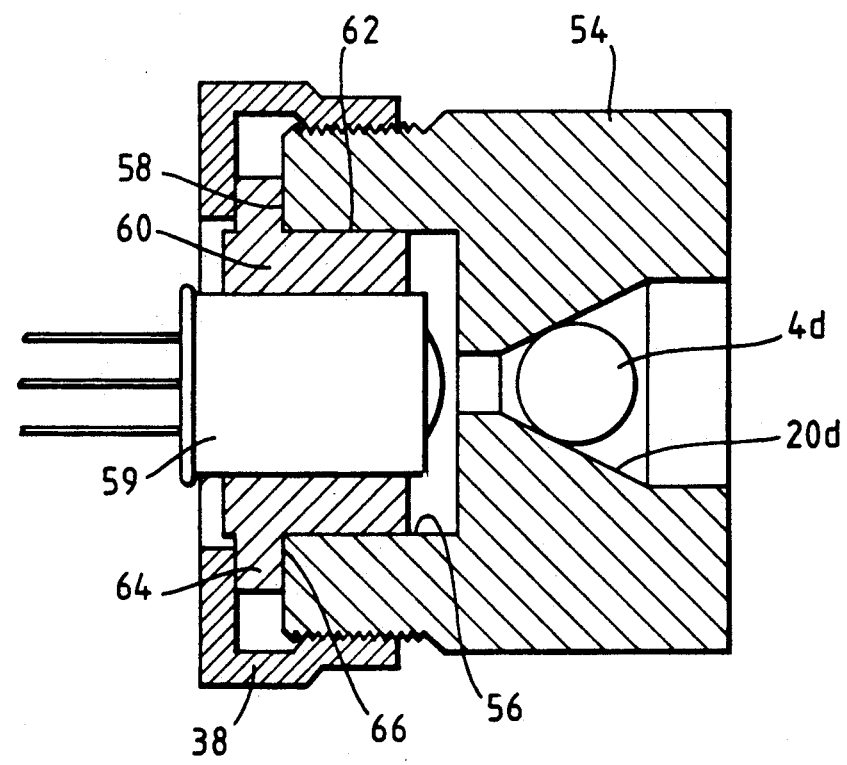

Also the embodiment according to FIG. 5 is modified in relation to the embodiment according to FIG. 4 with respect to the design of the surfaces of the diode retainer and the connector element engaging each other. The connector element 54 has a conical surface 20d, a cylindrical reference surface 56 and an annular reference surface 58 extending perpendicular to the cylindrical reference surface 56. The device also comprises a retainer for a diode 59 in the form of a sleeve 60. The sleeve 60 has a cylindrical, outer reference surface 62 which is adapted to engage the cylindrical surface 56 of the connector element 54 for defining the position of the diode 59 so that the optical axis thereof coincides with the axis of the cylindrical surface 56. As the axis of the cylindrical surface 56 coincides with the axis of the conical surface 20d the focus of the lens 4d will be positioned on the axis of the diode. For defining the axial distance of the diode 59 from the spherical lens 4d the sleeve 60 is provided with an outer, annular flange 64 having an annular surface 66 engaging the reference surface 58 of the connector element 54. Also in this embodiment the reference surfaces 56, 58, 62 and 66 provide for a correct relative position between the diode 59 and the spherical lens 4d so that the diode 59 and the lens 4d are positioned on the same optical axis and at a correct axial distance from each other. The sleeve 60 can be firmly connected with the diode 59 and can be adapted to obtain its final shape after the connection with the diode for example by forming the cylindrical reference surface 62 and the annular reference surface 66 on the flange 64 by means of turning after the connection of the sleeve with the diode.

Figure 6:
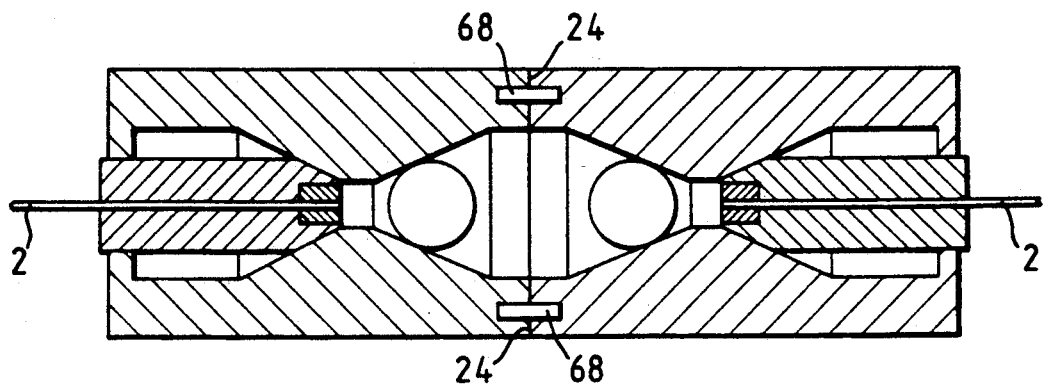
FIGS. 6, 7 and 8 are longitudinal sectional views of two devices according to the invention connected with each other for connecting two optical elements with each other by means of two spherical lenses.

In FIG. 6 there is schematically shown the connection of two optical fibers 2 with each other by means of devices according to the present invention. Thus, the two devices of the kind shown in FIG. 1 are connected with each other with the contact surfaces 24 in engagement with each other and the devices centered in relation to each other by means of guiding pins 68. The light beam from one of the optical fibers is magnified by the spherical lens optically connected with the fiber and departs from the lens as a parallel beam having a section which is several times larger than the beam received from the optical fiber, the beam from the lens being received by the other spherical lens which reduces the beam to the optical fiber connected with the second lens. Because of the magnification of the beam in the transition between the optical fibers the losses in the transition are reduced.

Figure 7:
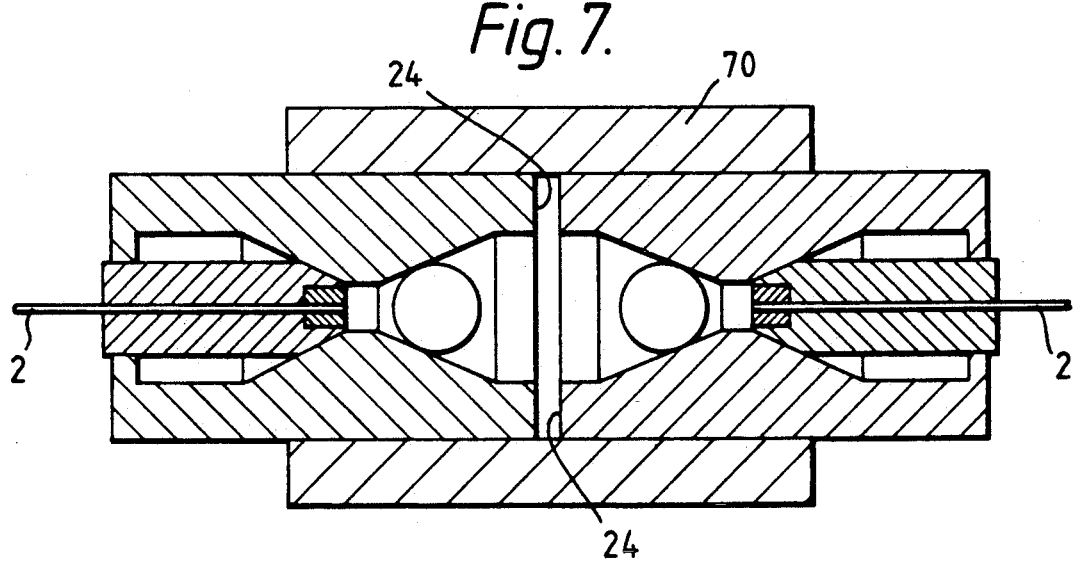

In FIG. 7 there is shown the connection of two devices of the kind shown in FIG. 1, wherein the devices are centered in relation to each other by means of an outer socket 70 rather than by guiding pins. The socket 70 makes it possible to provide a correct position of the devices on line with each other without an engagement between the end surfaces 24 of the devices. Therefore, it is not necessary to manufacture the end surfaces 24 with any special precision. The axial distance between the devices can be determined in any conventional way not shown in the figure.

Figure 8:
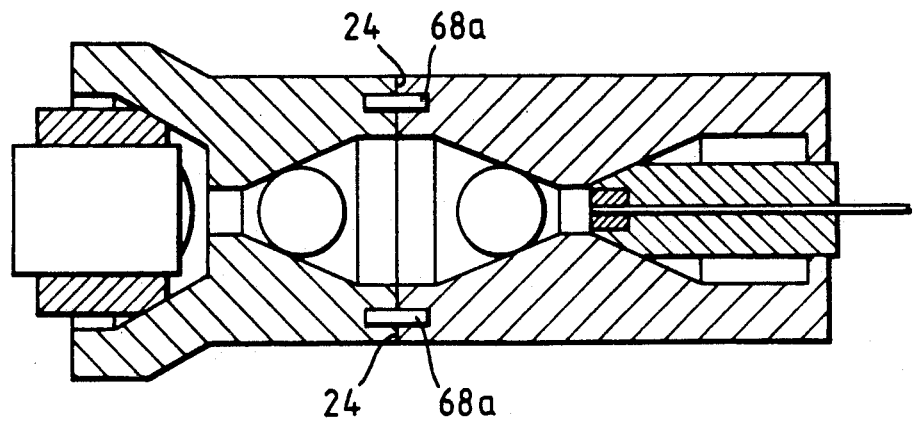

In FIG. 8 there is schematically shown the connection of a diode with an optical fiber by means of devices of the kind shown in FIG. 4 and FIG. 1, respectively. Also in this embodiment the devices engages each other at contact surfaces 24 and the devices are centered in relation to each other by means of guiding pins 68a.

It is recognized that the connection principles shown in FIGS. 6-8 can be used also with respect to the devices shown in FIGS. 2 and 5 and different combinations of the devices shown in FIGS. 1-5.

Figure 9:
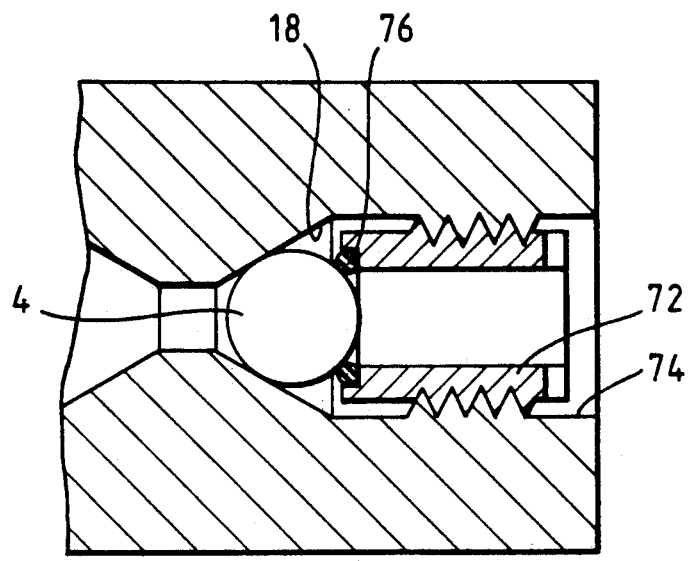
FIGS. 9, 10 and 11 are longitudinal sections of two different embodiments of devices for fixing the spherical lens in connector devices according to the invention.
Figure 10:
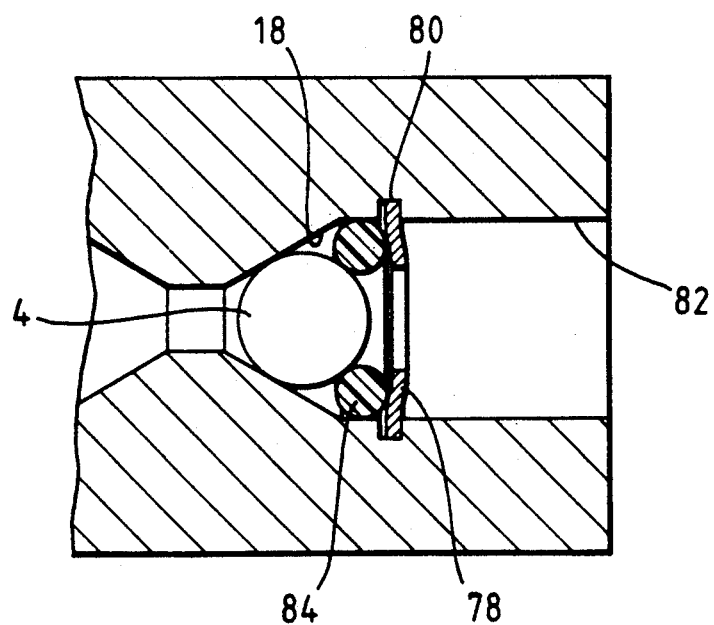

In FIGS. 9 and 10 there are shown suitable devices for retaining the spherical lens 4 in engagement with the conical surface 18.

In the embodiment according to FIG. 9 the spherical lens 4 is retained in engagement with the conical surface 18 by means of a plug 72 having an outer thread and being threaded into a hole 74 connecting with the conical surface 18. The plug 72 has at its end which is adapted to engage the spherical lens 4 a ring 76 consisting of elastic material and resiliently forcing the spherical lens 4 against the conical surface 18.

In the embodiment according to FIG. 10 the spherical lens 4 is retained in engagement with the conical surface 18 by means of a spring ring 78 which is mounted in a groove 80 in a hole 82 connecting with the conical surface 18. Between the spring ring 78 and the spherical lens there is provided a ring 84 of elastic material resiliently forcing the spherical lens 4 against conical surface 18.

Figure 11:
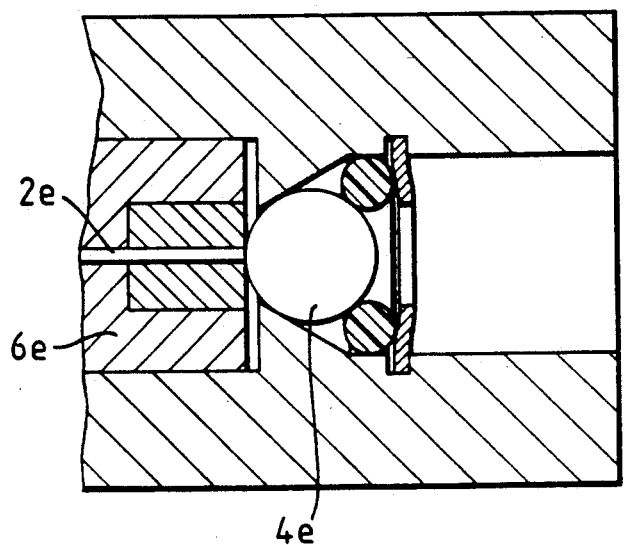

In FIG. 11 there is shown an embodiment of the present invention in which the relative position of the spherical lens 4e and the retainer 6e with the optical fiber 2e fixed therein is provided by a direct engagement between the spherical lens 4e and the end surfaces of the retainer and the fiber. In this case the spherical lens has a refractive index of such a magnitude that the focus is positioned in the surface of the lens.

Figure 12:
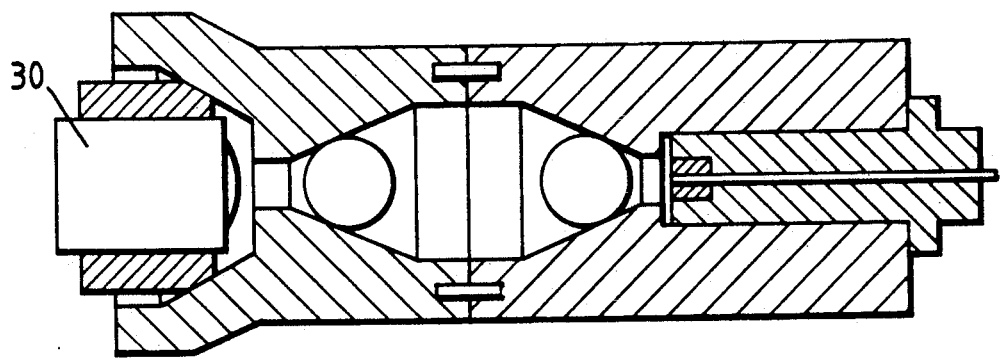
FIG. 12 is a longitudinal sectional view of two devices according to the invention connected with each other corresponding to FIGS. 6, 7 and 8.

The present invention can be modified within the scope of the following claims and can be adapted to different combinations of connection between optical fibers and other optical elements. In FIG. 12 there is shown a connection between a device of the kind shown in FIG. 4, comprising a diode 30 and a spherical lens optically connected therewith and a device according to FIG. 2 comprising an optical fiber and a spherical lens.

In a modified embodiment of the present invention the front surfaces of the devices are bevelled so as to prevent reflections of the optical signals.

I claim:

1. A device for optically connecting an optical element with a spherical lens, said device comprising a retainer for fixing the optical element in a predetermined position in relation to an outer reference surface of the retainer and a connector element having at least one surface for determining the position of the spherical lens as well as one surface cooperating with said outer reference surface of said retainer for determining the position of the retainer in relation to the spherical lens and for defining the relative position between the optical element and the spherical lens to correctly place the spherical lens and the optical element on the same optical axis with the end of the optical element being in the focus of said spherical lens, wherein the surface for determining the position of the spherical lens is constituted by a conical surface tapering in the direction of the optical element.

2. A device as claimed in claim 1, wherein the connector element is adapted to cooperate with fixing means adapted to cooperate with another connector element comprising an optical element connected with a lens for optically connecting the optical elements of the connector elements with each other through the lenses of the connector elements.

3. A device as claimed in claim 2, wherein the connector element has a contact surface extending perpendicular to the axis of the surface for determining the position of the spherical lens and the surface for determining the position of the retainer in relation to the spherical lens, said contact surface being adapted to engage a corresponding contact surface of the other connector element.

4. A device as claimed in claim 3, wherein the fixing means comprise a sleeve enclosing adjacent portions of the connector element.

5. A device as claimed in claim 3, wherein the fixing means are constituted by guiding pins.

6. A device as claimed in claim 2 wherein the fixing means comprise a sleeve enclosing adjacent portions of the connector element.

7. A device as claimed in claim 2 wherein the fixing means are constituted by guiding pins.

8. A device as claimed in claim 1, wherein the retainer is constituted by a clamping sleeve having a central opening for receiving the optical element.

9. A device as claimed in claim 8, wherein the clamping sleeve is adapted to be forced against the surface of the connector element which is adapted to determine the position of the retainer and thereby to reduce the area of the central opening to a position in which the clamping sleeve firmly encloses the optical element.

10. A device as claimed in claim 9, wherein the clamping sleeve is adapted at its central opening to contact the protective sheath of or directly against an optical fiber.

11. A device as claimed in claim 8, wherein the clamping sleeve is adapted at its central opening to contact the protective sheath of or directly against an optical fiber.

12. A device as claimed in claim 1, wherein the surface of the connector element for determining the position of the retainer in relation to the spherical lens is constituted by a conical surface positioned at an axial distance from and on the same axis as the conical surface for determining the position of the spherical lens and tapering in the direction thereof, said surface being adapted to be engaged by the outer reference surface of the retainer.

13. A device as claimed in claim 12 wherein the connector element comprises support surfaces which are positioned at a distance from the conical surface engaging the reference surface of the retainer and are adapted to engage the retainer for maintaining the correct position thereof.

14. A device as claimed in claim 12, wherein the optical element is constituted by an optical fiber, wherein the retainer is constituted by a sleeve having a flat end surface coinciding with the end surface of the optical fiber.

15. A device as claimed in claim 1, wherein the reference surfaces of the retainer and the surfaces of the connector element for positioning the optical element in the focus of the lens comprise cooperating cylindrical surfaces and contact surfaces extending transversely of the axes of the cylindrical surfaces.

16. A device as claimed in claim 15, wherein the surfaces extending transversely of the axes of the cylindrical surfaces comprise an end surface on the connector element and an opposite surface on a flange projecting from the cylindrical surface of the retainer.

17. A device as claimed in 15, wherein the surfaces extending transversely of the axes of the cylindrical surfaces comprise contact surfaces for a direct engagement between the spherical lens and the end surfaces of the retainer and the optical element.

18. A device as claimed in claim 1, comprising a fixing element for fixing the spherical lens in a position in which the spherical lens contacts the conical surface of the retainer element.

19. A device as claimed in claim 18, wherein the fixing element comprises a locking element consisting of a rigid material and engaging the retainer element and an elastic material element positioned between the locking element and the spherical lens.

20. A device as claimed in claim 1, wherein the optical element is constituted by an optical fiber, and the retainer is constituted by a sleeve having a flat end surface coinciding with the end surface of the optical fiber.

21. A device as claimed in claim 20, wherein the connector element comprises support surfaces which are positioned at a distance from the conical surface engaging the reference surface of the retainer and are adapted to engage the retainer for maintaining the correct position thereof.

22. A device as claimed in claim 1, wherein the retainer consists of a sleeve firmly connected with the optical element and having a reference surface which has been formed after the connection with the optical element.

23. A device for optically connecting an optical element with a spherical lens comprising:
 first and second means for relative positioning of said optical element and said spherical lens on the same optical axis and for positioning the end of said optical element in the focus of said spherical lens;
 said first means including a first conical surface on a connector element tapering in the direction of said optical element for positioning said spherical lens;
 p1 said second means comprising a second surface provided on said connector element at a predetermined distance from said first surface and a retainer having means for a fixed positioning of said optical element with respect to an outer reference surface of said retainer, said outer reference surface being designed to cooperate with said surface on said connector element of positioning said optical element on the same optical axis with said spherical lens and for positioning its end in the focus of said spherical lens.

24. A device as claimed in claim 23 wherein said second surface on said connector element is a conical surface tapering towards said first conical surface.

* * * * *

UNITED STATES PATENT AND TRADEMARK OFFICE
CERTIFICATE OF CORRECTION

PATENT NO. : 5,247,595
DATED : September 21, 1993
INVENTOR(S) : Peter Foldi

It is certified that error appears in the above-identified patent and that said Letters Patent is hereby corrected as shown below:

Column 10,
Claim 23, line 10, delete "pl".

Signed and Sealed this

Seventh Day of June, 1994

Attest:

BRUCE LEHMAN

Attesting Officer  Commissioner of Patents and Trademarks